3,057,838
POLYMERIZATION OF PROPYLENE
James L. Jezl, Swarthmore, Pa., assignor to Sun Oil Company, Philadelphia, Pa., a corporation of New Jersey
No Drawing. Filed June 22, 1959, Ser. No. 821,701
1 Claim. (Cl. 260—93.7)

This invention relates to the polymerization of propylene to high molecular weight solid polymers, and more particularly to a method for controlling the molecular weight of the polymer product.

It is known to polymerize alpha-olefins such as ethylene and propylene to high molecular weight polymers in the presence of a catalyst comprising a group IVa or Va metal halide or subhalide, such as titanium tetrachloride, titanium trichloride, and the corresponding zirconium or vanadium chlorides, activated by organometallic compounds such as aluminum alkyls or aluminum alkyl chlorides, or by metal hydrides such as sodium hydride or lithium aluminum hydride. The resultant active catalyst is believed to be a coordination complex of some type. The polymerization reaction is preferably carried out in the absence of air and in the presence of an inert liquid hydrocarbon medium such as heptane or isooctane.

In such a process it is desirable to control the average molecular weight and the molecular weight distribution of the polymer to yield a product having the desired processing characteristics and physical properties. If the average molecular weight is too high the melt index, as determined by ASTM test D–1238–52–T, or modifications thereof, is very low, and great difficulty is had in extruding or otherwise fabricating the polymer. If, on the other hand, the average molecular weight is too low or the molecular weight spread is wide, the tensile and impact strengths are low, and the product has a high brittle point. In the case of polyethylene it is know that the average molecular weight and molecular weight distribution may be controlled by varying the temperature at which the polymerization is carried out. For example, U.S. Patent 2,862,917 to Anderson et al. shows a process in which polymerization of ethylene is carried out at temperatures at which the polymer is in solution in the solvent. As the temperature is raised from 182° C. to 222° C. the melt index is raised from 0.04 to 1.05, indicating that at the higher temperatures the molecular weight is lower than at the lower temperatures, since melt index is one measure of molecular weight, and varies inversely therewith.

The average molecular weight of polypropylene may also be controlled by controlling the temperature of the polymerization. However, in the case of propylene, if the polymerization is carried out at temperatures in which the polymer is in solution, i.e., at temperatures of about 160° C. or above, the polymer has such a low molecular weight that it has no utility in the manufacture of films, fibers, or molded articles. At polymerization temperatures below about 90° C. the average molecular weight is so high that the melt index is undesirably low. At polymerization temperatures between about 90° C. and 160° C. the trouble is that the polymer is formed as a plastic, stringy mass that wraps itself around the impeller used to stir the reaction mixture, and clogs other parts of the apparatus. At the conclusion of the polymerization reaction there remains in the reactor a solid mass which has to be manually excavated from the reactor. While polymerization at these temperatures can be carried out in the laboratory, in a commercial plant the cost of digging out the polymer is prohibitive.

Results of laboratory work on the polymerization of propylene in the presence of titanium trichloride activated with aluminum triethyl is shown in the following table.

In all instances the catalyst was suspended in isooctane in a pressure vessel provided with a stirrer, the vessel was pressured to 120 p.s.i.g. with propylene, and the selected temperature was maintained by heat exchange means. As the reaction proceeded additional propylene was admitted to maintain the pressure at about 120 p.s.i.g., and the reaction was continued until the rate of consumption of propylene fell off markedly or until the stirrer jammed due to the accumulation of stringy polymer on its blades. At the end of the run the reactor was depressured, opened, and methanol was added to destroy the catalyst. Solid polymer was then removed from the reactor, separated from the isooctane, and extracted with boiling pentane to remove any pentane-soluble material. Molecular weight of the pentane soluble material was determined by the intrinsic viscosity method. When melt index is referred to, it means melt index determined by ASTM D–1238–52–T, modified in that an extrusion temperature of 230° C. was used. For fiber manufacture by melt spinning, a melt index of about 3 is optimum, while for film and molded article manufacture a melt index of from 1 to 5 appears to be satisfactory.

TABLE I

| Temperature, °C. | Molecular Weight | Melt Index |
|---|---|---|
| 160 | 15,000 | (¹) |
| 120 | 75,000 | 3 |
| 85–90 | 175,000 | 0.5 |
| 75–80 | 200,000 | 0.1 |

¹ Too high to determine.

As may be seen from the foregoing, the only polymer having a satisfactory molecular weight and melt index was produced at 120° C. At this temperature, however, the impeller jammed early in the run, due to the accumulation of stringy polymer. This temperature could not be used in commercial practice, because the polymer formed was not in a physical condition in which it could be easily handled.

I have now discovered that the controlling element in the formation of polypropylene of various molecular weights is not the temperature at which the polymerization takes place, but is the heat history of the catalyst. It has been determined that if the catalyst is heated to a temperature of from 100° C. to 150° C. for a period of at least fifteen minutes, while stirring vigorously, prior to use in a polymerization conducted at temperatures below 90° C., the molecular weight and melt index will closely approximate that which would have been obtained if the polymerization had been conducted at the temperature to which the catalyst had been heated. I prefer to heat the catalyst for about an hour, since more repeatable results are obtained thereby, but longer periods of heating do not adversely affect the activity of the catalyst. Since the polymer formed at temperatures under 90° C. is granular and easily handled, my discovery affords a method whereby the molecular weight of polypropylene may be controlled in a commercial process. The speed of the reaction, based on total yield in a given polymerization time, is somewhat lower using preheated catalyst, but this disadvantage is far overbalanced by the advantage of precise control over the molecular weight of the product.

In order that those skilled in the art may more fully appreciate the nature of my invention and the method of carrying it out, the following examples are given.

Example 1

A catalyst system consisting of .005 mol of titanium trichloride, .003 mol of aluminum trichloride, and .008 mol of aluminum triethyl in 400 milliliters of heptane was heated for one hour at 150° C. in a pressure vessel with vigorous stirring at an impeller speed of 1700 r.p.m. under sufficient pressure to keep the heptane in liquid phase. The vessel was then cooled to 80° C., and propylene was admitted to the vessel under a pressure of 130 p.s.i.g. Polymerization started immediately, and the reaction was continued for twelve hours while maintaining the temperature at 80–90° C. and the propylene pressure at 120–130 p.s.i.g. At the end of the reaction the vessel was opened and 60.1 grams of pentane-insoluble polypropylene having an average molecular weight, as determined by the intrinsic viscosity method, of 27,500, and a melt index of 5, was recovered.

The experiment was repeated, except that the aluminum triethyl was omitted from the catalyst system during the heat treatment, and was added only after the slurry of titanium trichloride and aluminum chloride had been cooled to 80° C. A polymerization of propylene under the conditions described above was then carried out for 14 hours. At the end of the reaction period 73 grams of polymer having an average molecular weight of 127,000 was recovered. This demonstrates that the activator must be present with the titanium chloride during the preheat in order to achieve control of molecular weight.

*Example II*

One gallon of isooctane containing 0.005 pound of titanium trichloride and 0.011 pound of aluminum triethyl is heated to 130 C. for one hour under agitation. The mixture is then cooled to 80° C. and is contacted with propylene at a pressure of 140 p.s.i.g. for a period of 2 hours. At the end of the reaction period 3.4 pounds of granular pentane-insoluble polypropylene is recovered, having an average molecular weight (intrinsic viscosity) of 60,000, and a melt index of 3.4.

*Example III*

One gallon of a mixture of $C_6$ and $C_7$ paraffinic hydrocarbons containing 0.005 pound of titanium trichloride, 0.074 pound of aluminum triethyl, and 0.00826 pound of aluminum ethyl dichloride is heated at 110° C. for a period of one hour under agitation. The mixture is cooled to 80° C. and is contacted with propylene at a pressure of 140 p.s.i.g. for a period of five hours while maintaining the temperature between 80° C. and 90° C. At the end of the reaction period ten pounds of granular pentane-insoluble polymer having an average molecular weight of 90,000, and a melt index of 1.6, is recovered.

*Example IV*

One gallon of a hydrocarbon mixture consisting chiefly of isomeric hexanes containing 0.005 pound of titanium tetrachloride and 0.05 pound of aluminum triisobutyl is heated, with agitation, at a temperature of 120° C. for a period of one-half hour. The mixture is cooled to 80° C. and is contacted with propylene at a pressure of 100 p.s.i.g. for a period of six hours, while maintaining the temperature at 80° C. to 90° C. At the end of the reaction six and one-half pounds of a granular pentane-insoluble polymer having an average molecular weight of 80,000 is recovered.

If the above examples are repeated using vanadium or zirconium chlorides in place of the titanium chlorides essentially the same control of molecular weight is attained. The rate of polymerization with these chlorides is however, substantially lower, and for this reason the titanium chlorides are preferred. Other organo-aluminum compounds, such as aluminum tripropyl, or aluminum diethyl chloride may be substituted for the organo-aluminum compounds set forth in the examples, with equivalent results.

The ratio of metal chloride to the organo aluminum compound may be varied over wide limits, but best results are obtained when the aluminum compound is present in a molar excess. Preferred metal chloride/aluminum compound molar ratios are from 1:1.5 to 1:6.

The invention claimed is:

A process for polymerizing propylene which comprises incorporating titanium trichloride, aluminum chloride, and an alkyl aluminum compound in a mol ratio of titanium to aluminum of from 1:1.5 to 1:6 in an inert hydrocarbon to form a catalytic system, heating the catalytic system at a temperature of from 100° C. to 150° C. for a period of at least fifteen minutes while agitating the system, thereafter cooling the system to a temperature below 90° C., contacting the system with propylene whereby to cause polymerization of the propylene, and recovering polypropylene having a lower molecular weight than would have been obtained had the heating step been omitted.

References Cited in the file of this patent

UNITED STATES PATENTS

| 2,874,153 | Bowman et al. | Feb. 17, 1959 |
| 2,909,510 | Thomas | Oct. 20, 1959 |
| 2,951,045 | Gamble et al. | Aug. 30, 1960 |
| 2,977,350 | Fasce et al. | Mar. 28, 1961 |

FOREIGN PATENTS

| 777,538 | Great Britain | June 26, 1957 |
| 573,748 | Canada | Apr. 7, 1959 |
| 526,101 | Italy | Aug. 14, 1955 |

OTHER REFERENCES

"Linear and Stereoregular Addition Polymers," by Gaylor, Interscience Pub. Co., 1959, pp. 109 to 122 and 131.